June 6, 1961

A. E. GRACIE, JR 2,987,142

ROTOR BRAKE

Filed Aug. 7, 1958

Inventor
Arden E. Gracie, Jr.
by Walter L. Schlegel, Jr.
Atty.

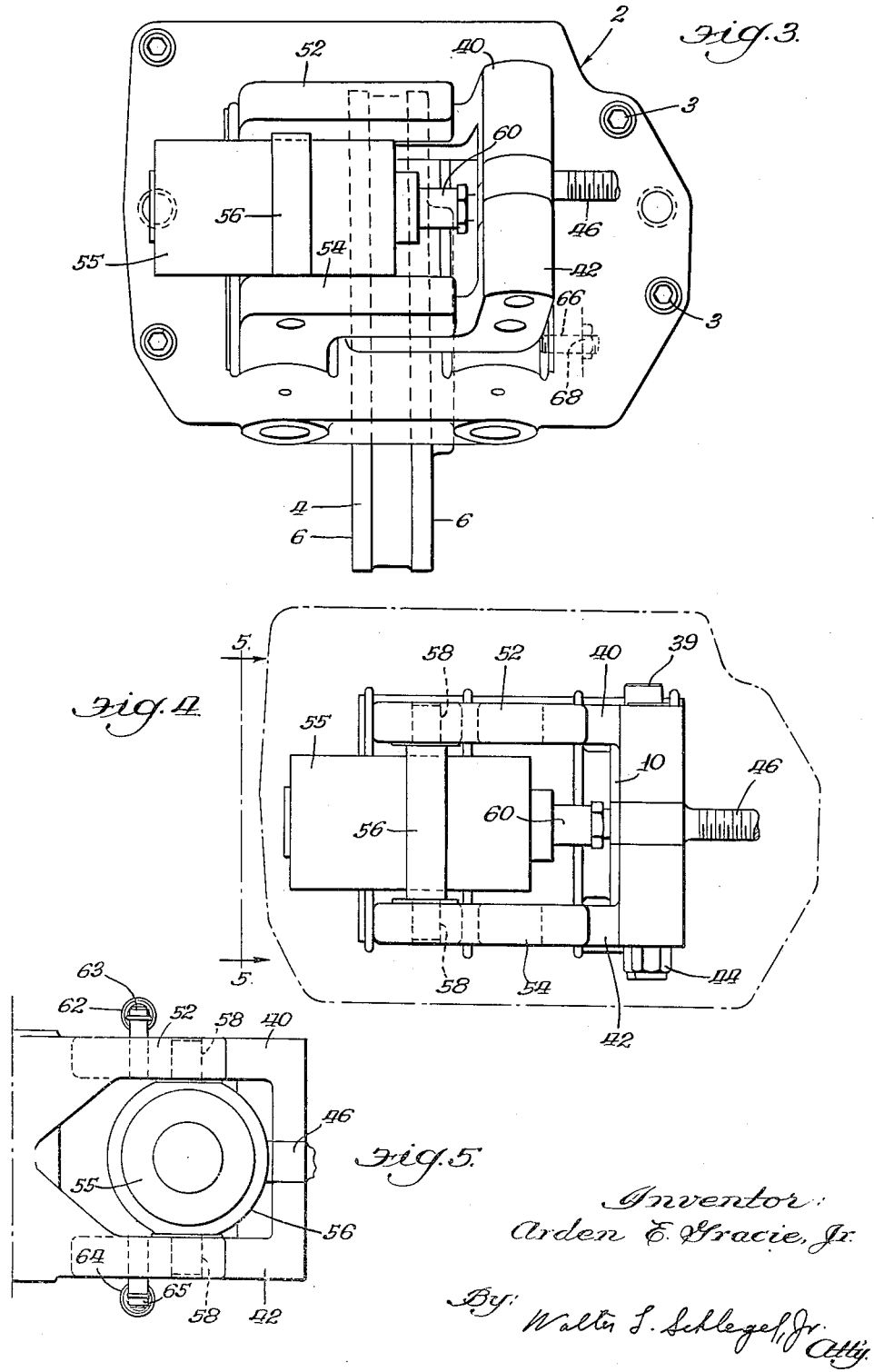

United States Patent Office 2,987,142
Patented June 6, 1961

2,987,142
ROTOR BRAKE
Arden Edgar Gracie, Jr., La Porte, Ind., assignor to American Steel Foundries, Chicago, Ill., a corporation of New Jersey
Filed Aug. 7, 1958, Ser. No. 753,764
9 Claims. (Cl. 188—59)

This invention relates to brakes, as for example a disc or rotor brake in which brake shoes are applied to opposite sides of a rotor to brake an axle or shaft of a vehicle such as a crawler tractor or other apparatus.

A primary object of the invention is to devise a brake such as above described which is usualy compact in construction, is economical to produce and maintain and is capable of long and efficient service.

A more specific object of the invention is to provide a novel rotor brake having power and hand brake actuators which occupy substantially no more space than would be required without a hand brake actuator.

Another object of the invention is to provide a hand brake actuator which consists of only one more part than a rotor brake without such an actuator.

Still another object of the invention is to provide a brake in which space is conserved in that the brake shoes are moved a minimum distance from the rotor surfaces upon release of the brake.

The foregoing and other advantages of the invention will become apparent from the consideration of the following specification and the accompanying drawings wherein:

FIGURE 3 is an end elevational view taken from the left as seen in FIGURE 1;

FIGURE 4 is another end elevational view taken on line 4—4 of FIGURE 1, and

FIGURE 5 is an elevational view taken on line 5—5 of FIGURE 4.

Figure 1:
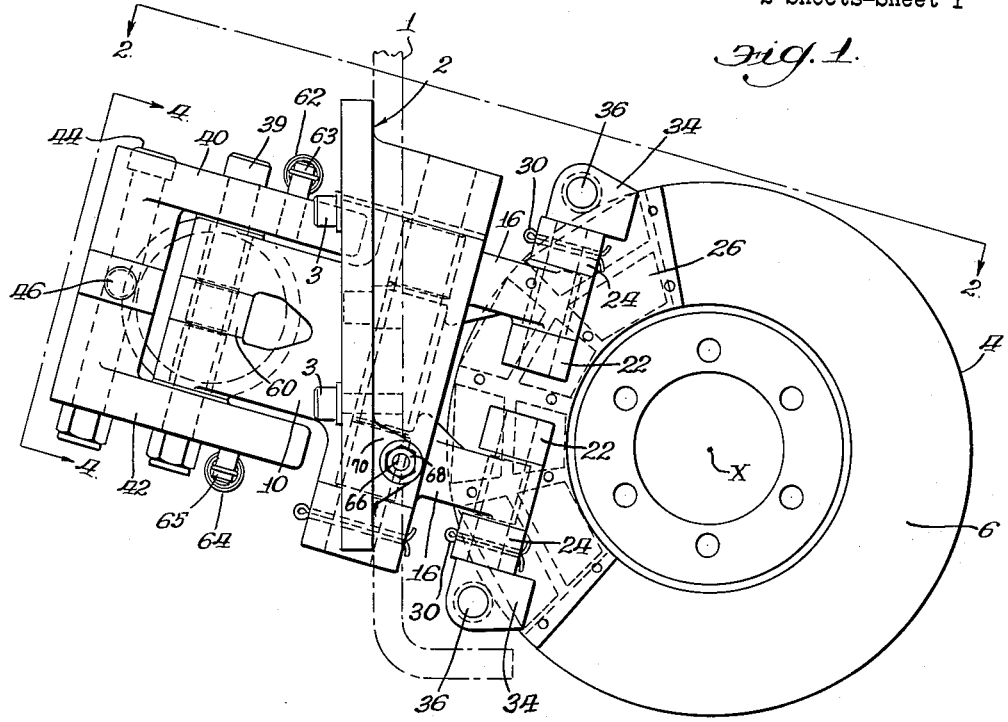
FIGURE 1 is a side elevational view of a crawler tractor brake embodying a preferred form of the invention.

In each of said views, certain details are omitted in the interest of clarity where such details are more clearly illustrated in other views.

Describing the invention in detail and referring to the drawings, the vehicle comprises a frame 1 to which a bracket 2 is attached as by bolts 3. The vehicle also comprises a rotor 4 which rotates on an axis X and is mounted in the usual manner on a rotatable member such as an anxle or a shaft (not shown). The rotor comprises oppositely facing friction surfaces 6 which are preferably substantially parallel to each other and disposed radially with respect to the rotational axis X of the rotor 4.

Figure 2:
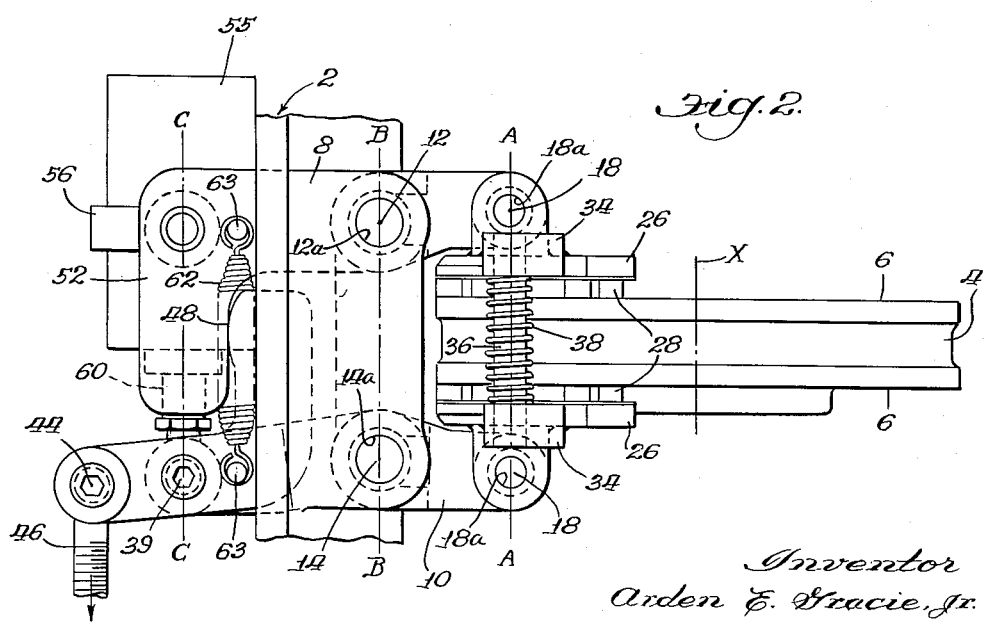
FIGURE 2 is a top plan view taken on line 2—2 of FIGURE 1.

Brake levers 8 and 10 are fulcrumed to the bracket 2 as by pins at 12 and 14, respectively, each lever having spaced arms 16 (FIGURE 1) pivotally connected as by pins as at 18 to radially inner and outer lugs 22 and 24 of a brake head 26 carrying a brake shoe or friction means 28. The brake shoes 28 associated with the brake heads 26 at opposite sides of the rotor 4 are adapted for brake engagement with the respective surfaces 6 as best seen in FIGURE 2.

The pins 18 are retained in assembled relationship as by cotter pins 30 and the radially outer brake head lugs 24 are provided with guides 34 for the reception of guide pins 36 each of which is tightly fitted in a complementary opening of a guide 34 on one brake head 26 and is slidably fitted in an opposite guide 34 of the other brake head 26. A release spring 38 is sleeved over each pin 36 and is compressible over opposed guides 34 of the respective brake heads 26 at opposite sides of the rotor, whereby upon actuation of the brake shoes 28 into braking engagement with the friction surfaces 6 as illustrated in FIGURE 2, the springs 38 are compressed and after actuation of the brake shoes 28 to released position, the spring 38 is effective to load pins 12 and 18 in a manner and for a purpose hereinafter more fully described.

The lever 10 is pivotally connected as by pin 39 to top and bottom bell crank levers 40 and 42 which are connected as by a pin 44 to a hand brake pull rod 46. Levers 40 and 42 straddle the lever 10 and their inner ends remote from the pull rod 46 are rockably seated as at 48 against top and bottom arms 52 and 54, respectively, of the lever 8 which is thus a bell crank lever actuated at 48 by the bell crank levers 40 and 42 upon actuation of the hand brake pull rod 46 in the direction of the arrow shown in FIGURE 2. It will also be noted that the pulling force on the rod 46 reacts at 39 against the lever 10 so that the levers 8 and 10 are substantially simultaneously actuated during a hand brake application.

A power cylinder 55 fastened within a yoke 56 which comprises top and bottom trunnions 58 pivoted within complementary openings of the lever arms 52 and 54. A piston (not shown) within the cylinder comprises a piston rod 60 pivoted by the pin 39 to the lever 10 whereby upon actuation of the power cylinder device 55, 60 as by compressed air or other fluid delivered under pressure to the cylinder 55, the levers 8 and 10 are pivoted in opposite directions about their fulcrums 12 and 18, respectively, to actuate the shoes 28 against the surfaces 6 in a power brake application.

It may be noted that during either a power brake application or a hand brake application, the adjacent sides of pins 12 and 14 are loaded by levers 8 and 10 as at 12a and 14a, respectively, and the remote sides of pins 18 associated with the respective brake heads are loaded by the levers 8 and 10, as at 18a, respectively. Thus it will be understood that upon release of the brake levers 8 and 10, as hereinafter described, there is a tendency for the pins 12 and 14 to move to the opposite sides of the complementary holes of the levers 8 and 10, respectively, and likewise there is a tendency for the pins 18 to move to the opposite sides of the holes in the levers. This tendency is due to normal clearance between the pins and their related holes and the tendency may become more pronounced under service conditions due to wear of the parts. As heretofore noted, the springs 38, however, prevent this undesirable tendency of the parts to move to the opposite sides of their holes upon release of the brake and thus as the levers 8 and 10 move to release position, the springs 38 maintain the pins 12 and 14 under load at 12a and 14a and maintain the pins 18 under load as at 18a. The load under these conditions is that developed by the spring 38 and is sufficient to insure complete release of the brake shoes 28 from the surface 6 upon release of the brake levers 8 and 10 as hereinafter described.

The brake levers 8 and 10 are urged to release position by a pair of release tension springs 62 and 64 which are connected directly to lever 8 and indirectly to lever 10, through bell crank levers 40 and 42, by upper and lower sets of pins 63 and 65, respectively. The mounting of the springs 62 and 64 will best be understood by consideration of FIGURES 1 and 2 and it will be apparent that upon release of the power cylinder device 55, 60 and the hand brake pull rod 46, the springs 62 and 64 rotate the levers 8 and 10 in such manner as to move the friction shoes 28 away from the surfaces 6. Positive and complete release of the brake shoes 28 is insured by means of the springs 38 as heretofore described.

Release movement of the lever 10 is limited by a set screw 66 threaded within a jab nut 68 which is mounted on ear 70 of the bracket 2. By proper adjustment of the set screw 66 and jam nut 68, the brake shoe 28 associated with the lever 10 may be completely released from the associated surface 6 by a very slight release movement of the lever 10. Similarly, the brake shoe 28 associated with the lever 8 may be completely released from the related surfaces 6 by a very slight movement of the lever 8 controlled by clearance of the cylinder 55 and the piston therein so that the brake may be applied and released by very slight rotative movements of the levers 8 and 10.

As best seen in FIGURE 2, the brake heads 26 are fulcrumed to the levers 8 and 10, respectively, on axes defined by a plane A—A which intersects the rotor surfaces 6. The levers 8 and 10 are fulcrumed on axes defined by a parallel plane B—B. The levers 8 and 10 are pivoted to the cylinder 55 and piston rod 60, respectively, on axes defined by a third plane C—C which is parallel to planes A—A and B—B. It will be understood that plane B—B passes between the brake shoes 28 and the arms of bell crank levers 40 and 42 which abut lever arms 52 and 54 as at 48. Moreover, these bell crank arms which abut lever arms 52 and 54 as at 48 are disposed between planes B—B and C—C as are the release springs 62. By means of this novel construction I have afforded an extremely compact and efficient brake arrangement which is economical to produce and occupies a minimum of space. The novel brake arrangement is efficient in operation and is capable of long life and service. Moreover, the necessary spaced amount of the brake has been minimized by devising an arrangement in which actuation and positive release of the brake shoe is insured despite extremely small movements of the levers 8 and 10 upon actuation and release thereof.

I claim:

1. In a brake arrangement, a pair of bell cranks each having spaced arms at corresponding ends thereof, the corresponding arms of each pair having direct rockable abutment with each other, a brake lever, said lever and one of the bell cranks having pivotal fulcrums, brake means pivotally connected to and actuated by said one bell crank and said brake lever, the other bell crank being pivotally fulcrumed to the brake lever, and power means disposed between and pivotally connected to the spaced arms of said one bell crank and to the brake lever, and hand actuating means pivotally connected to the other bell crank.

2. In a brake arrangement comprising a bell crank and a lever pivotally fulcrumed intermediate their ends, brake means operatively connected to said bell crank and lever at corresponding ends thereof, said bell crank having spaced arms disposed at the end thereof opposite the brake means, another bell crank fulcrumed to the lever and having spaced arms engageable with respective arms of the first-mentioned bell crank, a power cylinder disposed between and pivotally connected to the first-mentioned arms, a piston in said cylinder having a rod pivotally connected to the lever at the end thereof opposite the brake means, and hand brake actuating means connected to said other bell crank.

3. A brake arrangement according to claim 2, wherein spring means are connected between the bell cranks for urging the brake means to release position, and wherein other spring means are connected to the brake means for urging the brake means to release position independently of the first-mentioned spring means.

4. In a brake arrangement for a vehicle having rotatable brake surfaces, the combination of spaced brake levers fulcrumed to the vehicle, friction means actuated by said brake levers for braking said surfaces, one of said levers having spaced arms defining an opening therebetween, a cylinder disposed in said opening pivotally connected to said arms, a piston in said cylinder having a piston rod pivotally connected to the other lever at a point thereon, a hand brake lever pivoted to said other lever at said point, said hand brake lever having spaced arms having releasably direct abutment with the first-mentioned arms, respectively, and means for actuating the hand brake lever.

5. In a brake arrangement for a vehicle having rotatable brake surfaces, the combination of: a pair of brake levers each having structure defining two spaced holes, pins through corresponding holes of the levers fulcruming respective levers to the vehicle, a pair of brake heads carrying friction means for engagement with respective surfaces, other pins through the other corresponding holes of the levers pivotally connecting said levers to the respective heads for actuation thereof, operating means for said levers to urge the friction means against the related surfaces, so that the structure corresponding to the first-mentioned holes abuts the sides of the first-mentioned pins adjacent each other and the structure corresponding to the second-mentioned holes abuts the sides of the second-mentioned pins remote from each other, means operatively connected to the levers for urging them to release position and other means operatively connected to the heads to maintain said sides abutted when the levers are in release position.

6. A brake arrangement according to claim 5, wherein means are provided for limiting release movement of each of said levers.

7. In a brake arrangement, three levers having pivotal fulcrums intermediate their ends, respectively, one of said fulcrums being on one of said levers and movable therewith, brake means operatively connected to said one lever on the ends thereof remote from said one fulcrum and to another lever spaced from its fulcrum to urge it into direct engagement with the second-mentioned lever on the end thereof remote from said brake means.

8. In a brake arrangement comprising a bell crank and a lever pivotally fulcrumed intermediate their ends, brake means operatively connected to said bell crank and lever at corresponding ends thereof; another bell crank pivotally fulcrumed intermediate its ends to the lever at the end thereof opposite the brake means, one end of said other bell crank being abuttable with the first mentioned bell crank at the end thereof opposite the brake means; and brake actuating means connected to the other end of said other bell crank.

9. In a brake arrangement comprising a bell crank and a lever pivotally fulcrumed intermediate their ends; brake means operatively connected to said bell crank and lever at corresponding ends thereof; another bell crank pivotally fulcrumed intermediate its ends to the lever at the end thereof opposite the brake means, one end of said other bell crank being abuttable with the first mentioned bell crank, at the end thereof opposite the brake means; power cylinder brake actuating means pivotally connected to said first mentioned bell crank and lever at their corresponding ends thereof opposite the brake means; and hand brake actuating means connected to the other end of said other bell crank.

References Cited in the file of this patent

UNITED STATES PATENTS

| | | |
|---|---|---|
| 1,978,974 | Williams | Oct. 30, 1934 |
| 2,228,818 | Eksergian | Jan. 14, 1941 |
| 2,342,083 | Ledwinka | Feb. 15, 1944 |
| 2,365,369 | Williams | Dec. 19, 1944 |
| 2,383,376 | Gaenssle | Aug. 21, 1945 |
| 2,488,845 | Baselt | Nov. 22, 1949 |
| 2,498,625 | Tack | Feb. 21, 1950 |
| 2,827,132 | Buyze | Mar. 18, 1958 |
| 2,890,767 | Tack | June 16, 1959 |

FOREIGN PATENTS

| | | |
|---|---|---|
| 330,478 | Great Britain | June 12, 1930 |

UNITED STATES PATENT OFFICE
CERTIFICATE OF CORRECTION

Patent No. 2,987,142

June 6, 1961

Arden Edgar Gracie, Jr.

It is hereby certified that error appears in the above numbered patent requiring correction and that the said Letters Patent should read as corrected below.

Column 1, line 14, for "usualy" read -- unusually --; line 51, for "anxle" read -- axle --; column 2, line 72, for "jab" read -- jam --.

Signed and sealed this 14th day of November 1961.

(SEAL)
Attest:

ERNEST W. SWIDER
Attesting Officer

DAVID L. LADD
Commissioner of Patents
USCOMM-DC